Sept. 15, 1942.          T. S. ELLIOTT, SR                    2,295,939
                             ICE TRAY
             Filed Aug. 21, 1940              2 Sheets-Sheet 1
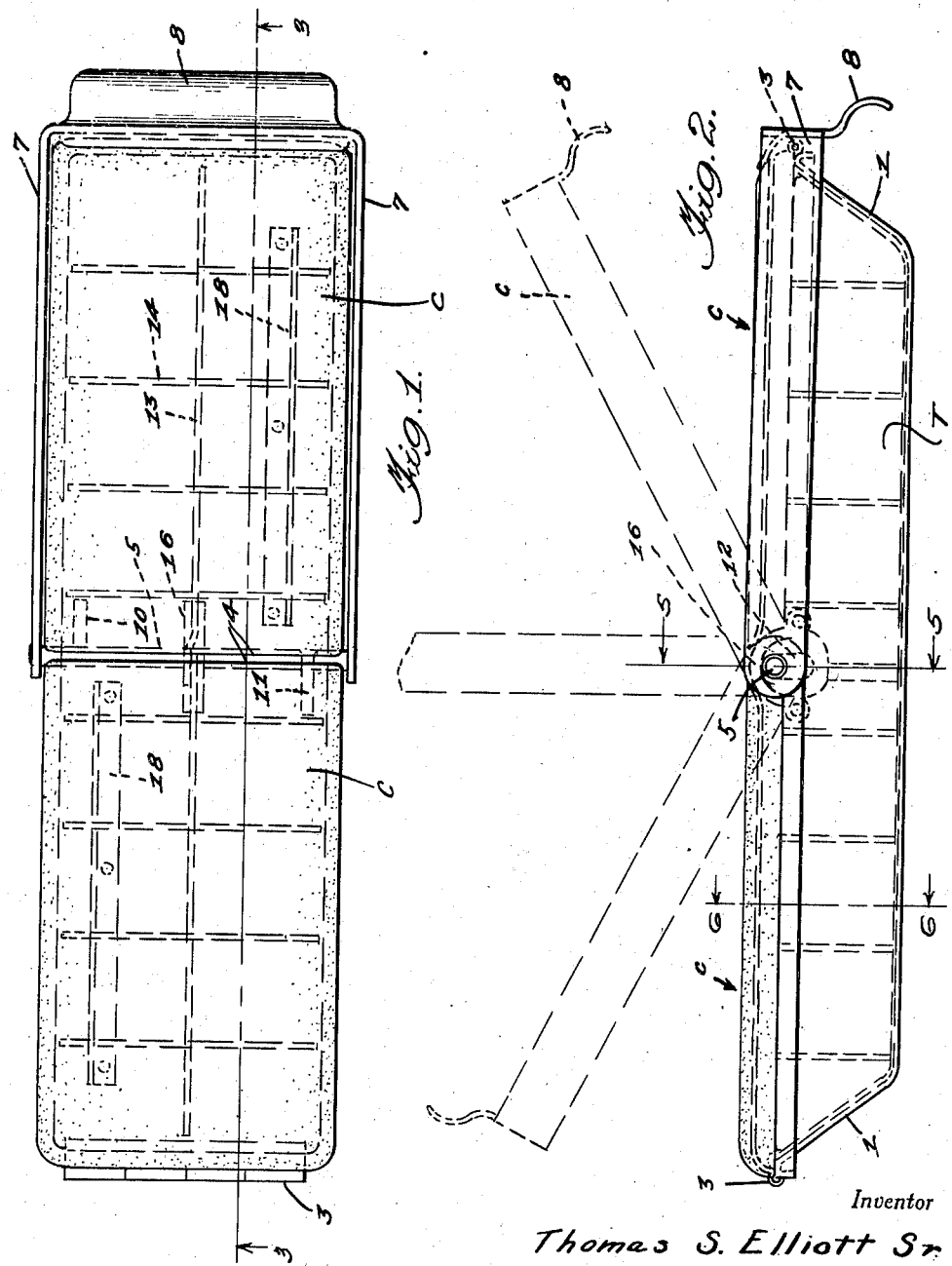
Inventor
*Thomas S. Elliott Sr.*
By *Clarence A. O'Brien*
Attorney Sept. 15, 1942.  T. S. ELLIOTT, SR  2,295,939
ICE TRAY
Filed Aug. 21, 1940  2 Sheets-Sheet 2
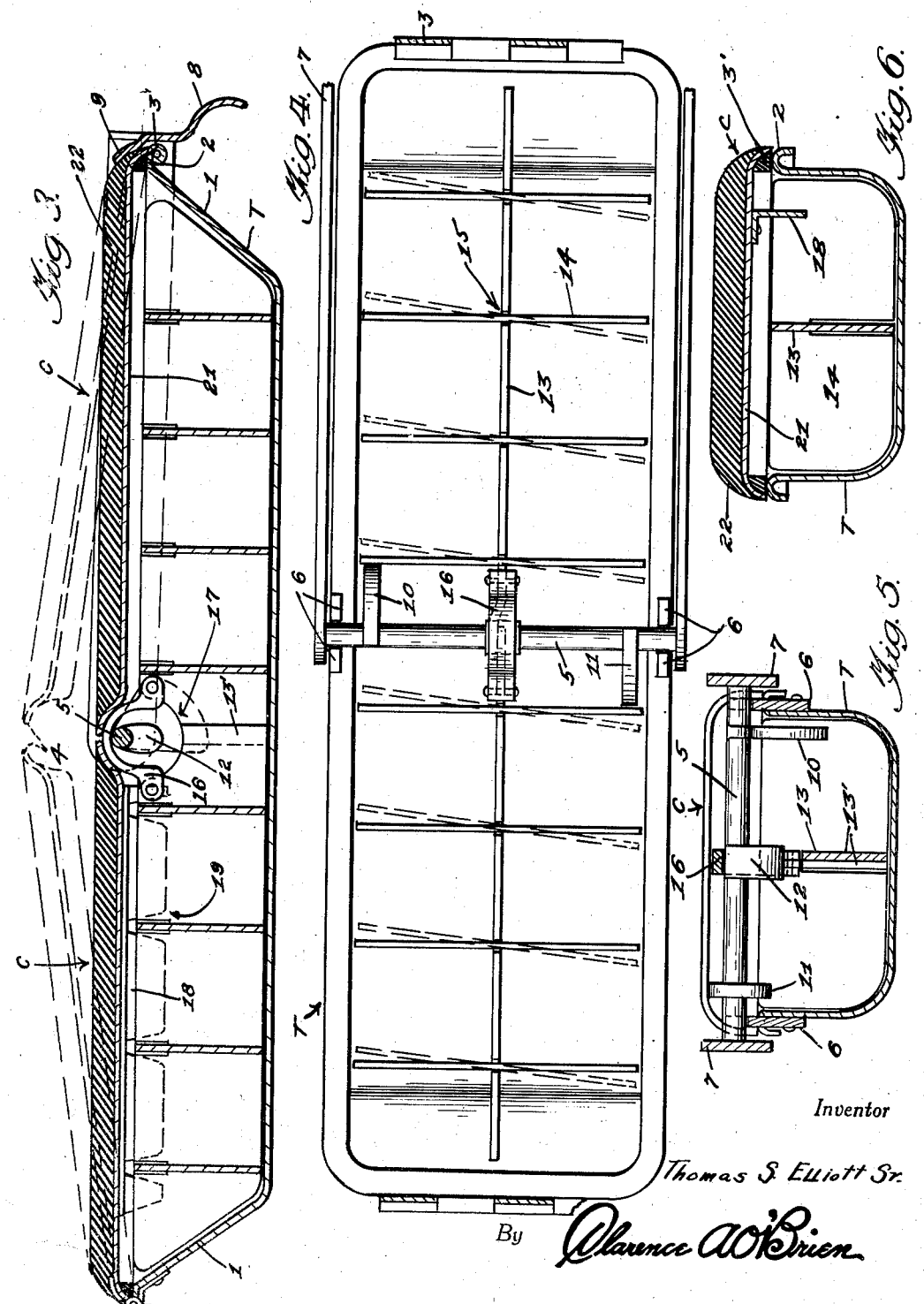
Inventor
Thomas S. Elliott Sr.
By Clarence A. O'Brien
Attorney Patented Sept. 15, 1942

2,295,939

UNITED STATES PATENT OFFICE 2,295,939

ICE TRAY

Thomas S. Elliott, Sr., Norfolk, Va. assignor of one-half to Birdie Lee Beem, Norfolk, Va.; Thelma Elliott Evans, administratrix of said Thomas S. Elliott, Sr., deceased Application August 21, 1940, Serial No. 353,558

9 Claims. (Cl. 62—108.5)

This invention relates to an ice tray for refrigerators, the general object of the invention being to provide simple means for breaking the bond between the ice cubes and the walls of the tray and its grid so that the cubes can be readily taken from the tray.

Another object of the invention is to provide cover means for the tray to prevent contamination of the water or the ice from other materials or substances placed in the refrigerator.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which—

Figure 1 is a top plan view of the improved tray.

Figure 2 is an elevational view showing the cover means and the operating means in lowered position and this view also showing in dotted lines the different positions of the operating means.

Figure 3 is a section on the line 3—3 of Figure 1, and showing in dotted lines the cover means in partly raised position.

Figure 4 is a top plan view with the parts shown in full lines before the operating means are actuated and in dotted lines after the operating means have been operated, this view showing the hinges for the cover means.

Figure 5 is a section on the line 5—5 of Figure 2.

Figure 6 is a section on the line 6—6 of Figure 2.

In these drawings the letter T indicates the tray and in carrying out my invention I make the end walls 1 of the tray slope upwardly and outwardly as shown. Also, the top edges of the tray are formed to provide seats 2 for a gasket 3' carried by the cover means so that when these means are in closed position a practically fluid-tight junction is provided between the upper edge of the tray and the cover means. Such means includes a pair of cover members C each of which is hinged at its outer end to an end of the tray as shown at 3 with the inner ends of the covers provided with turned-up parts 4 of curved construction which may be made to overlap to provide a tight junction on the two covers at the inner ends. Each cover is provided with downwardly and outwardly curved edges to overlap the upper part of the tray.

A cross shaft 5 is removably and rotatably supported at the center of the tray by having its ends fitting between the pairs of ears 6 extending upwardly from the center portion of the sides of the tray and a yoke-shaped handle member 7 has the ends of its limbs connected with the ends of the shaft with said handle member when in lowered position extending along the sides of one-half of the tray and along one end thereof and the bight part of the handle member is formed with a depending hand grip 8. This bight portion also is provided with an inwardly and upwardly extending part 9 to rest on the outer end of the adjacent cover.

The shaft is formed with the cams 10 and 11 which extend in opposite directions from end parts of the shaft and at the center of the shaft it is provided with a cam 12. The usual grid frame is placed in the tray and is composed of the longitudinally extending member 13 and the transverse extending members 14, these members being provided with the inter-engaging notches 15 in the usual manner but these notches are so formed that the cross members 14 can have rocking movement on the member 13. The member 13 is formed of two sections with their inner ends overlapping as shown at 13' with one inner end offset as shown in Figure 4. An inverted U-shaped member 16 has its ends connected with the adjacent or inner ends of the two sections of the member 13 and said ends of the two sections are recessed to provide the substantially semi-circular opening 17 in the upper portions of the inner ends. The cam 12 will engage the U-shaped member 16 when the shaft is partly rotated. Each cover is formed with a depending strip 18 which is provided with the upwardly tapered notches 19 for receiving portions of the transverse members 14 of the grid and these strips are placed relative to the cams 10 and 11 as shown in Figure 1, that is, each strip is located adjacent that side of the tray opposite the side to which the cam is adjacent. These strips with the notches 19, when the covers are lowered will act to position the members 14 so that the inner members will abut or come adjacent to the cams 10 and 11 so that they will be engaged by the cams when the shaft is rocked.

The outer ends of the member 13 are beveled upwardly to conform to the sloping ends 1 of the tray and each cover includes a metal plate 21 and a top member 22 of rubber or the like which is suitably connected with the plate 21.

As before stated, the covers are practically fluid-tight so that they will prevent the ice cubes or the water from being effected by food placed in the refrigerator and these covers also prevent the water from spilling from the tray when the tray is being placed in the refrigerator after being filled with water. These covers also enable the tray to be practically filled to the top with water.

When it is desired to remove ice cubes from the tray the member 7 is raised by its handle 8 so that the shaft is rotated and on the first part of this movement the covers are partly lifted so as to free them from any ice sticking to them and upon further movement of the shaft the cams 10 and 11 engage the inner members 14 of the grid, which have been moved against the cams by the notches 19 in the strips 18, and thus these members 14 are rocked from a straight position shown in full lines in Figure 4 to a sloping position shown in dotted lines in Figure 4. This acts to break the cubes from these members 14 and by engagement of the cam 12 with the U-shaped member 16 the sectional member 13 is first moved in one direction and then in an opposite direction and also the inner ends of these sections 13 are lifted which also lift the members 14 and thus the bond between the ice cubes, the members 13 and 14, and the side walls of the tray is broken. By providing the sloping end walls 1 the ice cubes at these ends can move up the sloping walls under pressure of the moving parts 13 and 14.

Then the shaft with the grid can be lifted from the tray by lifting upwardly the member 7.

Thus I have provided simple means for releasing the cubes from the tray and the grid thereof by a simple upward movement of the member 7 by means of the handle 8.

As will be seen the cover members C have flat tops so another tray can be placed thereon, if desired.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In an ice tray including a grid, a cross shaft rotatably and removably supported at the upper portions of the middle parts of the sides of the tray, means for rotating the shaft and cams on the shaft adjacent the ends thereof for engaging the inner pair of cross members of the grid for rocking such members to free the ice cubes from the grid and from the tray.

2. In an ice tray including a grid composed of a sectional longitudinal member, cross members constructed to have limited movement relative to the longitudinal member, a cross shaft supported for rotary movement at the upper portion of the middle of the tray, cams attached to the shaft adjacent the ends thereof, said cams engaging the inner cross members when the shaft is rotated to impart movement to said inner cross members, and, through ice cubes frozen in the tray, to impart movement to the other cross members, a U-shaped member connecting the inner ends of the sections of the longitudinal member together, a third cam on the shaft engaging the U-shaped member for imparting longitudinal movement to the longitudinal member and for lifting the same and means for rotating the shaft.

3. In an ice tray including a grid composed of a sectional longitudinal member, cross members constructed to have limited movement relative to the longitudinal member, a cross shaft supported for rotary movement at the upper portion of the middle of the tray, cams attached to the shaft adjacent the ends thereof, said cams engaging the inner cross members when the shaft is rotated to impart movement to said inner cross members, and, through ice cubes frozen in the tray, to impart movement to the other cross members, a U-shaped member connecting the inner ends of the sections of the longitudinal member together, a third cam on the shaft engaging the U-shaped member for imparting longitudinal movement to the longitudinal member and for lifting the same and means for rotating the shaft, a cover for the tray and members depending therefrom and having notches therein engaging the cross members of the grid to cause the inner cross members to engage the cams when the cover member is put in place.

4. In an ice tray including a grid composed of a sectional longitudinal member, cross members constructed to have limited movement relative to the longitudinal member, a cross shaft supported for rotary movement at the upper portion of the middle of the tray, cams attached to the shaft adjacent the ends thereof, said cams engaging the inner cross members when the shaft is rotated to impart movement to said inner cross members, and, through ice cubes frozen in the tray, to impart movement to the other cross members, a U-shaped member connecting the inner ends of the sections of the longitudinal member together, a third cam on the shaft engaging the U-shaped member for imparting longitudinal movement to the longitudinal member and for lifting the same and means for rotating the shaft, a cover for the tray and members depending therefrom and having notches therein engaging the cross members of the grid to cause the inner cross members to engage the cams when the cover member is put in place, said cover member being formed of two parts, each part being hinged at its outer end to an end of the tray and gaskets between the two parts of the cover member and the top of the tray.

5. In an ice tray including a grid comprising a longitudinal member having notches therein and cross members having notches therein interengaging with the notches of the longitudinal member, said longitudinal member being formed of two sections having their inner ends overlapping, and the ends of the tray sloping upwardly and outwardly, and the ends of the longitudinal member being shaped to correspond with the sloping ends of the tray, a U-shaped member of inverted form having its ends connected with the inner ends of the sections of the longitudinal member, a cross shaft rotatably supported by the tray and having a cam thereon for engaging the U-shaped member when the shaft is rotated to move the grid longitudinally in both directions and also to lift the inner portions of the grid, and means for rotating the shaft.

6. In an ice tray including a grid composed of a longitudinally extending member formed in two sections having their inner ends located adjacent each other and cross members supported for rocking movement on the longitudinal member, ears extending upwardly from the center portions of the sides of the tray, a cross shaft having its ends fitting between the ears, a yoke-shaped handle having the ends of its limbs connected with the ends of the shaft with the handle fitting around half of the tray when the handle member is in lowered position, a U-shaped member of inverted form having its ends connected with the inner ends of the sections of the longitudinal member, a cam on the shaft engaging the U-shaped member for rocking the longitudinal member and for lifting the sections thereof at their inner ends, oppositely extending cams on end portions of the shaft engaging the inner cross members to rock the same, a pair of covers hingedly connected at their outer ends to the ends of the tray, and gasket means between the covers and the tray, said covers having their inner ends resting on the U-shaped member to be raised thereby when the U-shaped member is raised.

7. In an ice tray having a grid therein, a cover member hingedly connected at one end to an end of the tray and means carried by the inner face of the cover member and adjacent parts of the grid, when the cover member is lowered upon the tray, for adjusting such parts of the grid to a certain position and holding them in this position.

8. In an ice tray having a grid therein, a cover member hingedly connected at one end to an end of the tray and means carried by the inner face of the cover member and adjacent parts of the grid, when the cover member is lowered upon the tray, for adjusting such parts of the grid to a certain position and holding them in this position, a manually rotatable shaft extending across a part of the tray, means carried by the shaft engaging parts of the grid for moving such parts to break the bond between the ice cubes and the grid and means carried by the shaft for properly raising the cover member when the shaft is rotated.

9. In an ice tray having a grid therein composed of a longitudinally extending member and cross members, a shaft extending across the tray and manually rotatable, cams on the shaft for engaging some of the cross members for imparting movement thereto, a cover hingedly connected to an upper part of the tray and means for raising the cover when the shaft is rotated.

THOMAS S. ELLIOTT, Sr.